United States Patent [19]

Di Battista

[11] 4,413,075
[45] Nov. 1, 1983

[54] PIPERIDINE POLYMERS AND USE THEREOF AS STABILIZERS

[75] Inventor: Piero Di Battista, S. Donato Milanese, Italy

[73] Assignee: Montedison S.p.A., Milan, Italy

[21] Appl. No.: 358,487

[22] Filed: Mar. 15, 1982

[30] Foreign Application Priority Data

Mar. 16, 1981 [IT] Italy ................ 20354 A/81

[51] Int. Cl.³ .............. C07D 401/12; C08K 5/34
[52] U.S. Cl. .................. 524/102; 525/187; 528/361; 546/188
[58] Field of Search .......... 524/102; 525/186, 187; 528/361; 546/16, 188

[56] References Cited

U.S. PATENT DOCUMENTS

| | | | |
|---|---|---|---|
| 2,730,531 | 1/1956 | Payne et al. | 546/16 |
| 3,692,778 | 9/1972 | Murayama et al. | 546/16 |
| 3,998,784 | 12/1976 | Cook | 524/102 |
| 4,031,095 | 6/1977 | Ramey et al. | 524/102 |
| 4,234,471 | 11/1980 | Wiezer et al. | 524/102 |
| 4,247,694 | 1/1981 | Rasberger | 546/188 |
| 4,265,803 | 5/1981 | Soma et al. | 528/361 |
| 4,265,805 | 5/1981 | Thomas | 524/102 |
| 4,340,534 | 7/1982 | Wiezer et al. | 524/102 |
| 4,351,915 | 9/1982 | Kubota et al. | |

Primary Examiner—John Kight, III
Assistant Examiner—R. A. White

[57] ABSTRACT

There are disclosed new polymers of piperidine having the general formula:

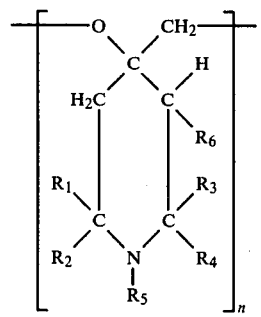

in which $R_1$, $R_2$, $R_3$, $R_4$, each independently of the others, are an alkyl radical having 1 to 4 C, or $R_1$ and $R_2$, and/or $R_3$ and $R_4$ form a cycloalkylene radical having 3 to 12 C, $R_5$ is hydrogen, an alkyl, hydroxyalkyl or alkyl-oxy radical having 1 to 6 C, or an aryl or an arylalkyl radical having 6 to 18 C, an alkenyl radical having 2 to 6 C or a $-(CH_2)_x-CO_2-R_7$ radical in which X is a number from 0 to 12, and $R_7$=H, a metal, an alkyl, alkylene, alkenyl, alkenylene radical containing 1 to 20 C; $R_6$=H or an alkyl having 1 to 4 C and n is an integer from 2 to 100.

Use of the piperidine polymers having general formula (I) as stabilizers of polymeric substances, and polymeric compositions stabilized with said piperidine derivatives are also disclosed.

17 Claims, No Drawings

PIPERIDINE POLYMERS AND USE THEREOF AS STABILIZERS

This invention relates to new polymers of piperidine and to the use thereof as stabilizers.

More particularly, the present invention relates to substituted poly-oxy-methylene-piperidines particularly suited to stabilize polymeric substances subject to degradation, such as discoloration and embrittlement, caused by exposure to light, especially to ultraviolet light, and by the action of oxygen and of heat.

BACKGROUND OF THE INVENTION

As is known, actinic radiations, particularly those comprises in the ultraviolet zone, adversely affect the appearance and the properties of the organic polymers. For example the polyester, usually colorless, yellows when exposed to sunlight; the oxidation rate of the polyolefins in air is greatly increased by ultraviolet light; polystyrene discolors and breaks, thus correspondingly losing its desirable properties, when exposed to actinic light, etc.

It has been proposed to stabilize the polymeric materials against degradation caused by ultraviolet light by employing various types of agents opposing such effects.

The sterically hindered amines (HALS) and in particular the derivatives of 2,2,6,6-tetra-alkyl-piperidine belong to such class of stabilizers.

In particular, U.S. Pat. No. 4,104,248 describes polymeric compounds of 4-amino-2,2,6,6-tetra-alkyl-piperidine to be utilized as stabilizers for polymeric substances against the degrading action of ultraviolet radiations and of oxygen.

THE PRESENT INVENTION

One object of the present invention is to enhance the photo-stabilizing and thermo-stabilizing activity of the above-mentioned polymeric compounds, while keeping unchanged the other desirable chemical-physical properties such as: low extractability with water, solubility and consistency with the substances to be stabilized, diffusibility in the product, non-volatility, etc.

I have found that this and other objects are achieved by employing the substituted poly-oxy-methylene-piperidines having the general formula:

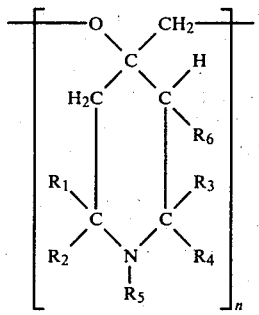

(I)

in which: $R_1$, $R_2$, $R_3$, $R_4$, either like or unlike one another, are each an alkyl radical containing 1 to 4 carbon atoms, or $R_1$ and $R_2$, and/or $R_3$ and $R_4$, together, form a cyclo-alkylene radical containing 3 to 12 carbon atoms; $R_5$ may be hydrogen, an alkyl, hydroxyalkyl or alkyl-oxy radical containing 1 to 6 carbon atoms; an aryl or aryl-alkyl radical containing 6 to 18 carbon atoms; an alkenyl radical containing 2 to 6 carbon atoms or a $-(CH_2)_x-CO_2R_7$ radical, in which X is zero or an integer from 1 to 12 and $R_7$ is H, a metal selected from the alkaline metals, such as Na and K, from the alkaline-earth metals, such as Ba and Ca, and from the transition metals, such as Ni and Co, an alkyl, alkylene, alkenyl, alkenylene radical, each containing 1 to 20 carbon atoms; $R_6$ is hydrogen or an alkyl radical containing 1 to 4 carbon atoms and n is an integer ranging from 2 to 100.

The present invention provides too, compositions based on thermoplastic synthetic polymers, stabilized to oxidation and to ageing, containing, as a stabilizer, a polymer of the substituted oxy-methylene-piperidine having said general formula (I) in an amount sufficient to prevent any degradation of the polymer.

In the practical embodiment of the present invention, the preferred stabilizers are the alkyl-substituted poly-oxy-methylene-piperidines having general formula (I), in which:

$R_1$, $R_2$, $R_3$ and $R_4$ are each methyl;
$R_5$ is hydrogen or methyl;
$R_6$ is hydrogen, and
n is an integer from 4 to 20.

The substituted poly-oxy-methylene-piperidines forming the object of the present invention, are obtainable by polymerizing 4-spiro-oxirane derivatives of the substituted piperidine having general formula:

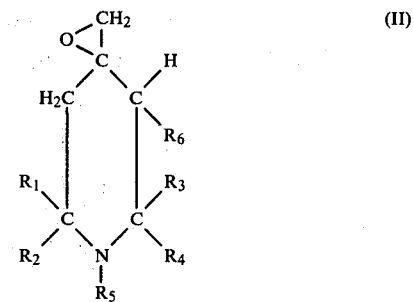

(II)

in which $R_1$, $R_2$, $R_3$, $R_4$, $R_5$ and $R_6$ have the meanings specified hereinabove.

The polymerization reaction is accomplished by heating the monomer at 50°–250° C., in an inert atmosphere such as nitrogen, helium, argon, etc., in the presence of any known catalysts suitable for the polymerization of epoxides.

Some examples of known catalysts which may be advantageously utilized in the polymerization of the 4-spiro-oxirane derivatives of substituted piperidine having general formula (II) are: hydroxides of alkaline and alkaline-earth metals, amides of alkaline and alkaline-earth metals, alkoxides of alkaline and alkaline-earth metals, oxides of alkaline-earth metals, organic bases such as pyridine, polyamines, polyaminespolyamides, carbonates of alkaline-earth metals, Lewis acids such as $AlCl_3$, $FeCl_3$, $BF_3$, $TiCl_4$, $BCl_3$, etc., alkyl metals such as aluminum triethyl or alkyl-oxides of metals such as aluminum isopropoxide, either alone or combined with Lewis acids, etc.

The 4-spiro-oxirane derivatives of the substituted piperidine having general formula (II), may be prepared according to conventional methods, starting from a solution in acetonitrile of dimethylsulphonium methylide, to which the carbonyl compound corresponding to the derivative to be obtained is added. The reaction is conducted in the presence of an alkoxide or of a hydride of an alkaline metal.

The reaction can be schematically represented as follows:

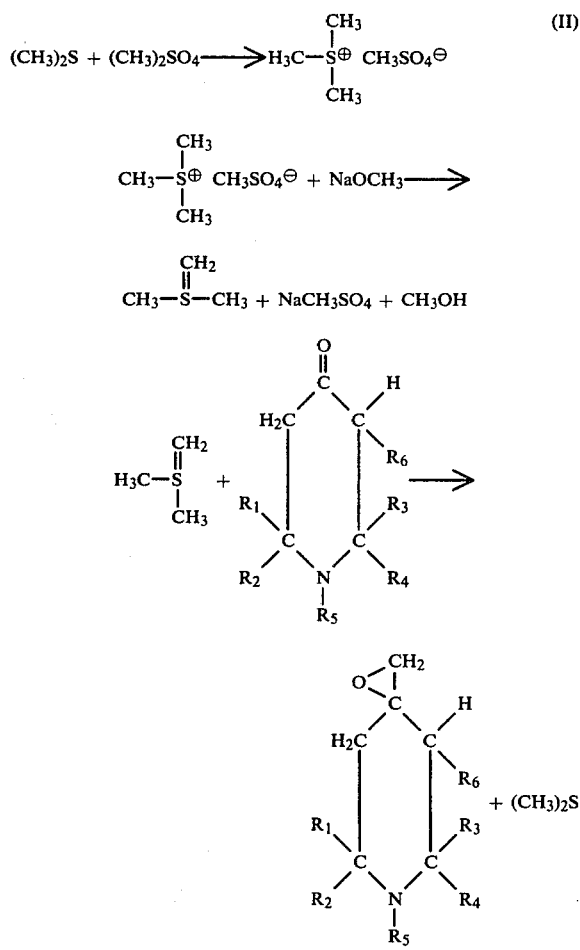

The substituted poly-oxy-methylene-piperidines, having general formula (I), which are an object of the present invention, besides possessing the well-known excellent photostabilizing properties of the HALS, exhibit a surprisingly improved stabilizing power against thermo-oxidation.

The materials which can be stabilized by means of the compounds of this invention are predominantly the synthetic organic polymeric substances, including:

polyolefins and olefin copolymers among which are high density and low density polyethylene, polypropylene, polystyrene, polybutene, polyisoprene and the like, and copolymers of olefins with other ethylenically unsaturated monomers, such as ethylene-propylene copolymers, ethylene-butene copolymers, styrene-butadiene copolymers, styrene-acrylonitrile and acrylonitrile-styrene-butadiene copolymers;

polyvinyl chloride and polyvinylidene chloride, including the homopolymers and the copolymers of vinyl chloride and of vinylidene chloride with each other or each with vinyl acetate or other ethylenically unsaturated monomers;

polyacetals, such as polyoxymethylene and polyoxyethylene;

polyesters, such as polyethylene terephthalates;
polyamides, such as nylon 6, nylon 6-6 and nylon 6-10;
polyurethanes;
polycarbonates;
thermoplastic elastomers;
natural and synthetic rubbers, etc.

Such synthetic polymers may be employed either as powders or granules, or as formed articles, for example, fibers, films, sheets, etc., or as latex or foams.

Of the synthetic copolymers mentioned, the ones which are more suited to stabilization according to the present invention, are the polyolefins deriving from monomers having the general formula: $R-CH=CH_2$, wherein R is an alkyl or aryl group, or a hydrogen atom.

Of the polyolefins, it is preferable to use polypropylene prevailingly consisting of isotactic macromolecules and obtained by the stereospecific polymerization of propylene.

The amount of poly-oxy-methylene-piperidine having general formula (I) to be added to the polymeric substance to be stabilized, according to the present invention, is not critical and may vary over a wide range as a function of the type, properties and particular uses of the substance. Generally, said stabilizers may be added in amounts of from 0.01 to 5.0% by weight.

Practically, however, the amount varies as a function of the type of substance to be stabilized. Thus, for example, in the case of polyolefins, such amount varies from 0.01 to 2% by weight; for polyvinyl chloride and polyvinylidene chloride the amount may range from 0.01 to 1% by weight, while for the polyurethanes and the polyamides the amount may be comprised between 0.01 and 5% by weight.

The poly-oxy-methylene-piperidines having general formula (I) may be employed either alone or in admixture with other known additives, such as antioxidants, U.V.-ray absorbers, pigments, fillers, basic nitrogenous containing polycondensates, stabilizers, etc.

Some examples of such additives are oxy-benzotriazoles, oxy-benzo-phenones, Ni-stabilizers, metal soaps, phenolic anti-oxidants, phosphites, phosphinites, thioesters, hydroquinone derivatives, triazinic compounds, acylamino-phenols, benzyl-phosphonates, etc.

Such additives may be employed along with the polymers having general formula (I) in a weight ratio of from 0.5:1 to 3:1.

The incorporation of the polymers having general formula (I) or of the mixture containing said polymers into the synthetic polymer to be stabilized may be accomplished according to any conventional procedure and at any stage, prior to or after the polymerization, or during the manufacture of shaped articles from said polymer.

Thus it is possible to simply mix the powdery stabilizing polymer with the polyolefin or other synthetic polymer to be stabilized, under stirring; or a solution of the stabilizing polymer in a suitable solvent may be mixed with the synthetic polymer to be stabilized and the solvent evaporated; or the stabilizing polymer may be added to the synthetic polymer at the conclusion of the polymerization. Furthermore it is possible to get the stabilizing action by applying the stabilizer on the manufactured article, for example by dipping it into a solution or dispersion of the stabilizer and then by evaporating the solvent or the dispersant.

The following non-limiting examples are given for a more detailed understanding of the present invention and for further enabling those skilled in the art to practice the same.

Unless otherwise specified, all the parts indicated in the following examples are to be understood as parts by weight.

EXAMPLE 1

A. Preparation of 2,2,6,6-tetramethyl-piperidine-4-spiro-oxirane 94.6 g (0.75 mole) of dimethyl sulphate $(CH_3)_2SO_4$, dissolved in 350 cc of acetonitrile, and 51.25 g (0.825 mole) of dimethyl sulphide, dissolved in 150 cc of $CH_3CN$, were introduced into a 2-liter flask. The mass was stirred for a few hours and allowed to stand overnight.

44.55 g (0.825 mole) of $CH_3ONa$ were added to the mixture, under stirring, and, in half an hour, a solution of 77.5 g (0.5 mole) of triacetonamine dissolved in 50 cc of $CH_3CN$ was gradually added.

After stirring the mixture for 4 hours at room temperature, most of the solvent was distilled under vacuum and 500 cc of $H_2O$ were added to the mixture. The reaction mixture was then extracted three times with 200 cc of $CHCl_3$ each time, and the organic phase was evaporated from the solvent and rectified under vacuum.

75.6 g of product having a boiling point of 44°–45° C./1 mm Hg were obtained. The product was analyzed under a gas-chromatograph on a column SUPELCO SP 1000: it revealed a titer higher than 95%.

On the basis of the I.R. and N.M.R. spectra and of the centesimal analyses, the compound was recognized as 2,2,6,6-tetramethyl-piperidine 4-spiro-oxirane having the following formula:

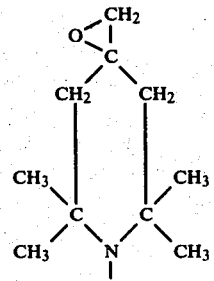

B. Preparation of poly-oxy-methylene-2,2,6,6-tetramethyl-piperidine 10 g of the 2,2,6,6-tetramethyl-piperidine-4-spiro-oxirane, obtained as above, and 0.66 g of KOH were introduced, under a nitrogen flow, into a 100 ml flask. The mixture was heated, in a nitrogen atmosphere, to 150° C. for 6 hours, under stirring. It was allowed to cool down to room temperature and the resulting solid was dissolved in $CHCl_3$. The solution was repeatedly washed with water and dried with $Na_2SO_4$. The solvent was first removed by means of a rotating evaporator and then by heating to 120° C./0.1 mm of Hg.

A very viscous, light-yellow liquid was obtained, which had a glass transition temperature (Tg) of 20° C. and an average molecular weight, determined by the osmometric method, equal to 650.

On the basis of the N.M.R. and I.R. spectra and of the centesimal analyses, the following structural formula was attributed to the product:

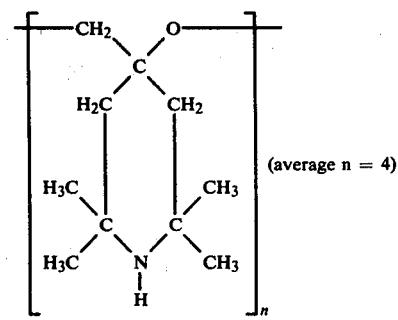

C. Stabilization tests

To 300 g of not stabilized polypropylene, having an intrinsic viscosity, measured at 130° C. in tetralin, of 162 cc/g, a residue of the extraction with heptane of 96.5% and an ash content of 80 ppm, there were added 200 cc of chloroform containing, dissolved therein, the above-obtained poly-oxy-methylene-2,2,6,6-tetramethyl-piperidine, in the amount recorded in Table I.

The mixture was stirred for about 6 hours at room temperature in a rotating evaporator, then it was dried at 0.01 mm of Hg and at 50° C. for 1 hour. The resulting additioned powder was extruded in a Brabender extruder at 220° C. and granulated. The granules were transformed into films having a uniform thickness of 50–60 microns and into 1 mm thick plates. On the articles so obtained, the thermo-oxidative stability as well as the photo-oxidative stability were determined.

The thermo-oxidative stability was determined on the basis of the resistance to ageing in an oven, considered as the embrittlement time (E.T.) required to notice, with the naked eye, crackings or chalking of the surface of the plate being tested, as well as other modificationd due to exposure in an oven at 150° C. in an air stream.

The photo-oxidative stability was determined on the basis of the embrittlement time, considered as the time required to cause the rupture of the film, by means of a single 180° bending, after exposure to the Xenotest 1200 under the conditions of standard DIN 54004:
 temperature of the black panel: 43±2° C.;
 relative humidity: 50±5%;
 alternate exposure.

TABLE I

| Added Amount (%) | Thermo-oxidative Stability Embrittlement Time (h) | Photo-oxidative Stability Embrittlement Time (h) |
|---|---|---|
| — | >24 | 100 |
| 0.3 | 350 | 2000 |
| 0.5 | 650 | 2500 |

EXAMPLE 2

A. Preparation of 1,2,2,6,6-pentamethyl-piperidine-4-spiro-oxirane

Operating according to the modalities described in Example 1A, there were employed, respectively, 40 g (0.237 mole) of N-methyl-triacetone amine, 24.24 g (0.39 mole) of dimethyl sulphide, 44.78 g (0.355 mole) of dimethyl sulphate and 21.06 g (0.39 mole) of sodium methoxide.

From the organic phase, after rectification, 35.3 g of product were obtained, which had a boiling point of 54° C./1 mm Hg and a titer higher than 98%.

On the basis of the N.M.R. and I.R. spectra and of the centesimal analyses, the following formula was attributed to the product:

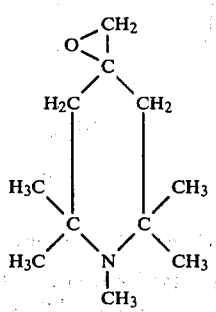

B. Preparation of poly-oxy-methylene-1,2,2,6,6-pentamethyl-piperidine

Operating exactly according to the modalities of Example 1B, 10 g of 1,2,2,6,6-pentamethyl-piperidine 4-spiro-oxirane were treated with 0.6 g of KOH. A light-yellow solid product was obtained, which softened at 77° C. and had an average molecular weight of 1230, determined according to the osmometric method.

On the basis of the I.R. and N.M.R. spectra and of the centesimal analyses, the following formula was attributed to the product:

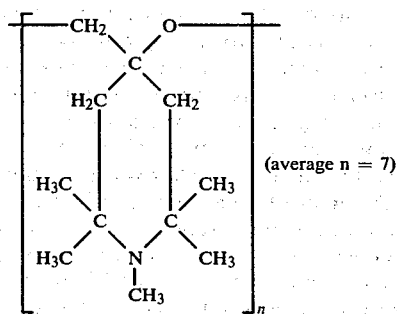

(average n = 7)

C. Stabilization tests

By operating according to the conditions described in Example 1C, there were prepared polypropylene films and plates stabilized with the above-obtained poly-oxy-methylene-1,2,2,6,6-penta-methyl-piperidine, in the amounts shown in Table II. The thermo-oxidative and photo-oxidative stabilities were determined on the articles, the relevant values obtained being recorded in said Table.

TABLE II

| Added Amount (%) | Thermo-oxidative Stability Embrittlement Time (h) | Photo-oxidative Stability Embrittlement Time (h) |
|---|---|---|
| 0.3 | 580 | 1800 |
| 0.5 | 1100 | 2400 |

What is claimed is:

1. Substituted poly-oxy-methylene-piperidines having the general formula:

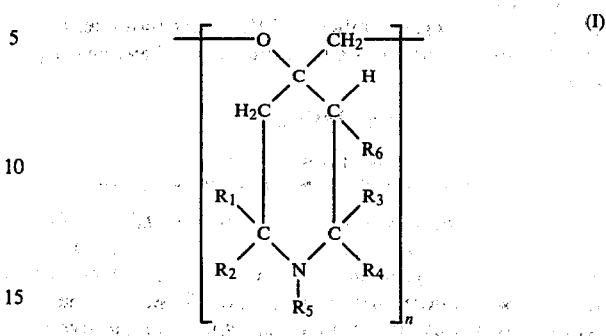

wherein:
$R_1$, $R_2$, $R_3$, $R_4$, either like or unlike one another, are each an alkyl radical containing 1 to 4 carbon atoms, or $R_1$ and $R_2$, and/or $R_3$ and $R_4$, together, form a cyclo-alkylene radical containing 3 to 12 carbon atoms;

$R_5$ is hydrogen, an alkyl, hydroxyalkyl or alkyl-oxy radical containing 1 to 6 carbon atoms; an aryl or arylalkyl radical containing 6 to 18 carbon atoms; an alkenyl radical containing 2 to 6 carbon atoms or a $-(CH_2)_xCO_2R_7$ radical in which X is zero or an integer from 1 to 12 and $R_7$ is H, a metal selected from the alkaline metals, the alkaline-earth metals, and the transition metals, an alkyl, alkylene, alkenyl, alkenylene radical, each containing 1 to 20 carbon atoms;

$R_6$ is hydrogen or an alkyl radical containing 1 to 4 carbon atoms, and n is an integer from 2 to 100.

2. Substituted poly-oxy-methylene-piperidines having general formula (I) according to claim 1, in which: $R_1$, $R_2$, $R_3$, $R_4$ are each methyl; $R_5$ is hydrogen or methyl; $R_6$ is hydrogen and n is an integer from 4 to 20.

3. Substituted poly-oxy-methylene-piperidines having general formula (I) according to claim 1 and in which $R_5$ is a $-(CH_2)_xCO_2R_7$ radical with $R_7$ being selected from the metals Ba, Ca, Na, K, Ni and Co.

4. A process for preparing the substituted poly-oxy-methylene-piperidines having general formula (I), as in claims 1, 2 or 3, characterized in that it consists in polymerizing, at a temperature ranging from 50° to 250° C. and in the presence of a known catalyst suitable for the polymerization of epoxides, 4-spiro-oxirane derivatives of piperidine, which have the general formula:

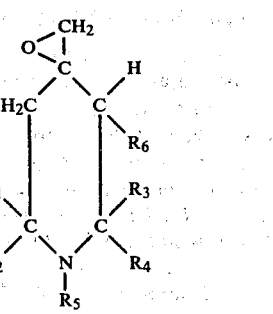

in which:
$R_1$, $R_2$, $R_3$, $R_4$, either like or unlike one another, are each an alkyl radical containing 1 to 4 carbon atoms, or $R_1$ and $R_2$, and/or $R_3$ and $R_4$, together, form a cyclo-alkylene radical containing 3 to 12 carbon atoms;

$R_5$ is hydrogen, an alkyl, oxyalkyl or alkoxy radical containing 1 to 6 carbon atoms, an aryl or arylalkyl radical containing 6 to 18 carbon atoms; an alkenyl radical containing 2 to 6 carbon atoms or a —$(CH_2)_xCO_2R_7$ radical in which X is zero or an integer from 1 to 12 and $R_7$ is H, a metal selected from the alkaline metals, the alkaline-earth metals, and the transition metals, an alkyl, alkylene, alkenyl, alkenylene radical, each containing 1 to 12 carbon atoms; and $R_6$ is hydrogen or an alkyl radical containing 1 to 4 carbon atoms.

5. The process of claim 4 in which in the general formula for the 4-spiro-oxirane derivative of piperidine, $R_5$ is a —$(CH_2)_xCO_2R_7$ with $R_7$ being selected from the metals Ba, Ca, Na, K, Ni and Co.

6. A composition comprising a thermoplastic synthetic polymer stabilized to light, to oxygen and to heat, and characterized in that it contains, in an amount sufficient to prevent degradation of the thermoplastic synthetic polymer, a substituted poly-oxy-methylene-piperidine having the general formula (I) according to claim 1.

7. A composition according to claim 6, characterized in that the substituted poly-oxy-methylene-piperidine having general formula (I) is present therein in an amount of from 0.01 to 5% by weight, referred to the thermoplastic synthetic polymer.

8. A composition according to claim 6, characterized in that the thermoplastic synthetic polymer is a polyolefin.

9. A composition according to claim 8, characterized in that the polyolefin is polypropylene consisting prevailingly of isotactic macromolecules.

10. A composition according to claim 8, characterized in that the substituted poly-oxy-methylene-piperidine having general formula (I) is contained therein in an amount ranging from 0.01 to 2% by weight.

11. A composition according to claim 9, characterized in that the substituted poly-oxy-methylene-piperidine having general formula (I) is contained therein in an amount from 0.01% to 2% by weight.

12. A composition according to claim 6, characterized in that the thermoplastic synthetic polymer is polyvinyl chloride or polyvinylidene chloride.

13. A composition according to claim 12, characterized in that the substituted poly-oxy-methylene-piperidine having general formula (I) is contained therein in an amount from 0.01 to 1% by weight in respect to the polyvinyl chloride or polyvinylidene chloride.

14. A composition according to claim 6, characterized in that the thermoplastic synthetic polymer is a polyurethane or a polyamide.

15. A composition according to claim 14, characterized in that the substituted poly-oxy-methylene-piperidine having general formula (I) is contained therein in an amount from 0.01 to 5% by weight.

16. A composition according to claim 6 or 7, characterized in that the substituted poly-oxy-methylene-piperidine having general formula (I) is employed in admixture with other additives selected from the group consisting of oxy-benzotriazoles, oxy-benzophenones, Ni-stabilizers, metal soaps, phenolic antioxidants, phosphites, phosphinites, thioesters, hydroquinone derivatives, triazinic compounds, acylamino-phenols, and benzyl-phosphonates.

17. A composition according to claim 16, characterized in that the other additives are present with the substituted poly-oxy-methylene-piperidine having general formula (I), in a weight ratio ranging from 0.5:1 to 3:1.

* * * * *